United States Patent

Giel

[15] 3,706,861

[45] Dec. 19, 1972

[54] APPARATUS FOR MOUNTING AND SPACING A SIGNAL TRANSDUCER WITH RESPECT TO A RECORDING MEDIUM

[72] Inventor: George James Giel, Los Angeles, Calif.

[73] Assignee: RCA Corporation

[22] Filed: Sept. 18, 1969

[21] Appl. No.: 859,057

[52] U.S. Cl...................179/100.2 P, 179/100.2 CA, 340/174.1E

[51] Int. Cl...........................G11b 5/58, G11b 21/20

[58] Field of Search.......179/100.2 P, 100.1 R, 100.2 CA, 179/100.2 MD, 100.2 S, 100.41 P; 310/8; 340/174.1 F, 174.1 E; 346/74 MC

[56] References Cited

UNITED STATES PATENTS

| | | | |
|---|---|---|---|
| R20,213 | 12/1936 | Sawyer | 179/100.41 P |
| 3,201,526 | 8/1965 | Wessels | 179/100.2 P |
| 3,183,516 | 5/1965 | Sliter | 340/174.1 E |
| 2,751,439 | 6/1956 | Burton | 179/100.2 S |
| 2,858,373 | 10/1958 | Hollmann | 179/100.41 PE |
| 3,433,904 | 3/1969 | Kowalik | 179/100.41 PE |
| 3,526,726 | 9/1970 | Corbett et al. | 179/100.2 CA |

*Primary Examiner*—James W. Moffitt
*Assistant Examiner*—Raymond F. Cardillo, Jr.
*Attorney*—Edward J. Norton

[57] ABSTRACT

A device for supporting and controlling the position of a signal transducer with respect to a recording medium. A body of material which exhibits dimensional change in the presence of an electric or magnetic field applied to the material, is utilized as part of the support structure for the transducer and/or the recording medium. The value of the field applied to the material determines the relative spacing of the transducer and recording medium. Servo means, responsive to the relative spacing between the transducer and medium, may be provided for controlling the field, to establish and maintain a desired spaced relation therebetween.

1 Claim, 2 Drawing Figures

INVENTOR.
GEORGE J. GIEL
BY James B. Hayes
ATTORNEY

APPARATUS FOR MOUNTING AND SPACING A SIGNAL TRANSDUCER WITH RESPECT TO A RECORDING MEDIUM

This invention relates to apparatus for establishing and controlling the position of a signal transducer with respect to a recording medium, and is especially useful where there is relative motion between the transducer and the recording medium.

The apparatus to which this invention relates is particularly, although not exclusively, adapted for use in combination with tape, drum or disc magnetic recorder-reproducer systems used as memory storage devices in computing machines and the like. It is also applicable to audio frequency recording apparatus where the elimination of head-tape wear is important.

Where the recording medium moves relative to the transducer, it is usually desirable to space the transducer close to but not in contact with the recording medium. This close spacing is particularly important in systems where the recorded data is in the form of magnetic bits, since the spacing between the recording medium and the transducer determines the maximum bit density and hence the storage capacity that can be achieved. Conversely, continuous or intermittent contact between the transducer and the recording medium produces undue wear, the accumulation of dirt and results in degradation of the recorded signal.

It is well known that the rapid relative movement of the recording medium and transducer generates a laminar flow air or gas fluid layer between them. The rapidly moving fluid layer may be used to cause a transducer to "fly" or float at a given distance from the recording medium. The prior art disclosed several methods by which signal transducers may be caused to "fly" by utilizing a fluid bearing. However, many problems are encountered in devising practical fluid bearing means for controlling the relative position of a transducer and a recording medium. The relative speed of the transducer and recording medium may be too low for sustaining a fluid bearing. Alternatively, a high relative speed may make such arrangements susceptible to acceleration forces that can be induced by vibration and positional changes. Although these forces are relatively small, they make many such systems impractical for usage in dynamic environments such as aircraft and moving vehicles.

It is clear that systems which must rely on fluid bearing arrangements, for relative positioning of the transducer, are susceptible to not only erratic positioning of the transducer, but also undesirable "crashing" of the transducer on the surface of the recording medium. Further, unless special precautions are taken there is deleterious rubbing contact between the transducer and the recording medium while starting and stopping the apparatus.

It is therefore an object of the present invention to circumvent the problems of fluid bearing transducer support arrangements, by providing an improved and novel means of positioning a signal transducer in stable and predetermined relation to a recording medium.

In accordance with one embodiment of the invention, a structure is provided for establishing and controlling the position of a signal transducer with respect to a recording medium. The structure comprises a body of material which exhibits dimensional change in the presence of an electric or magnetic field. This body is coupled to either the transducer or the recording medium, or both, to affect the position of the transducer with respect to the recording medium in accordance with the value of an electric or magnetic field applied to the body.

Figure 1:
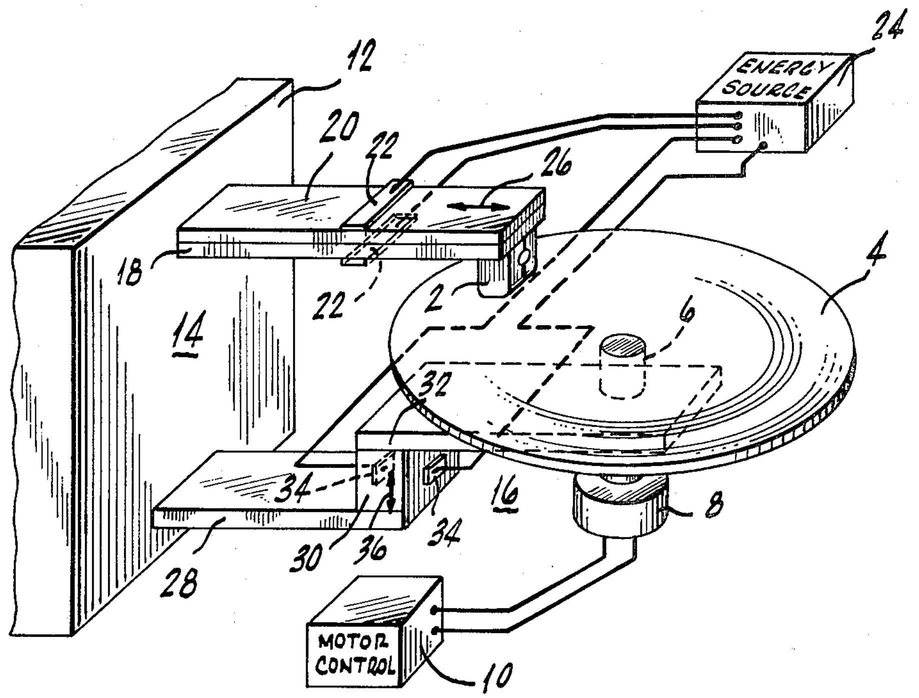
FIG. 1 is a perspective diagrammatic view of a portion of a recorder-reproducer system embodying the present invention.

The recorder reproducer system portion shown in FIG. 1 includes a signal transducer 2 and a movable recording medium 4 in the form of or affixed to a disc. The recording medium disc 4 is coupled to a shaft 6 which is rotated by a motor 8 in response to control signals from a motor control unit 10. Other specific elements of such recorder-reproducer systems, such as record and playback circuitry, are well known and for purposes of clarity are not shown in the drawing.

The transducer 2 and recording medium 4 are coupled to a main supporting frame 12 by the assemblies 14 and 16 respectively. The assemblies 14 and 16 constitute position establishing and control means, for determining the relative space relation of the transducer 2 and medium 4 with respect to the support 12, and hence with respect to each other. As shown in FIG. 1, the transducer 2 and recording medium are disposed closely adjacent to each other. The assembly 14 includes a cantilevered bar shaped member 18 which may form a portion of the support 12 or be coupled at one end to the support 12. The transducer 2 is coupled to the free end portion of the cantilevered bar 18.

Secured to the bar 18 is an element 20, which is comprised of a body of material of the class which exhibits changes in its (preferably linear) dimensions, i.e. strain, in the presence of an electric or magnetic field. Such a class of materials includes piezoelectric, electrostrictive and magnetostrictive materials. Examples of materials that may be utilized for the element 20 are barium titanate, lead zirconate, ammonium dihydrogen phosphate, and lithium sulfmate nickel, nickel-cobalt-iron and nickel-iron.

In operation, the material of element 20 is oriented in accordance with the polarization of its crystalline structure and the direction of an applied electric or magnetic field, to produce an expansion or contraction in a desired direction. Where the material of the element 20 is responsive to an electric field, such a field may be applied to the element 20 by a pair of electrodes 22 which are preferably provided on two oppositely disposed surfaces of the material 20 and are coupled to a potential source 24. Although not shown, an electric field may alternatively be externally generated and applied in a given direction to the material of element 20.

Alternatively where the material 20 is magnetic field responsive, a magnetic field is applied to the material 20. The magnetic field may be produced, for example, by passing a current through a coil encircling or in the vicinity of material 20.

In the operation of the system thus far described, a field is applied to the element 20 by means of the energy source 24 and electrodes 22. The orientation of the material of element 20 is chosen to produce a strain longitudinally along the axis shown by the arrow 26, in response to the applied field. The bar 18 is made of a material which is deformable; however the dimensions of the bar 18 are not altered by an electric or magnetic field. Since the bar 18 and element 20 are secured together, the elongation of the material of element 20 causes the bar 18 to be deformed and bend in the direction of the recording medium 4. The transducer 2, which is mounted to the free end portion of the bar 18, is thus positioned correspondingly closer to the recording medium 4. By varying the output of the energy source 24, the value of the field applied to the material of element 20 may be controlled and therefore the positioning of the transducer 2.

The assembly 16 of FIG. 1 includes a bar shaped member 28, an element 30 comprising a body of material of the same class hereinbefore discussed, which exhibits dimensional change in the presence of an electric or magnetic field and another bar shaped member 32. The bar 28 may form a portion of the support 12 or be separate and coupled at one end in a cantilevered manner to the support 12. The other end of bar 28 is coupled to one surface of the element 30. A second surface of the element 30 is coupled to elongated member 32 to which the recording medium 4 is mounted. The elongated members 28 and 32 are preferably made to be substantially rigid, non-deformable and dimensionally unaffected by an electric or magnetic field. For applying a desired field to the material of element 30, a pair of electrodes 34 are provided on two surfaces of the material and coupled to the energy source 24.

The operation of the assembly 16 is in principle the same as described above in connection with the assembly 14. The orientation of the material of element 30 is chosen to produce an elongation along the axis shown by the arrow 36, in response to the applied field (although an applied electric field is shown a suitable magnetic field could alternatively be employed, if the element 30 exhibits strain in the presence of a magnetic field). Since the members 28 and 32 are rigid and unaffected by the applied field, the elongation of the material of element 30 causes the recording medium 4 coupled to the member 32, to be positioned in closer spatial relation to the transducer 2. Again, the positioning of the recording medium can be controlled by controlling the value of the field applied to the material of element 30, i.e. by controlling the voltage between the electrodes 34.

The arrangement for positioning the transducer 2 and the arrangement for positioning the recording medium 4 may be interchanged. Alternatively, either arrangement may be utilized for positioning only the transducer 2, only the recording medium 4, or both.

Figure 2:
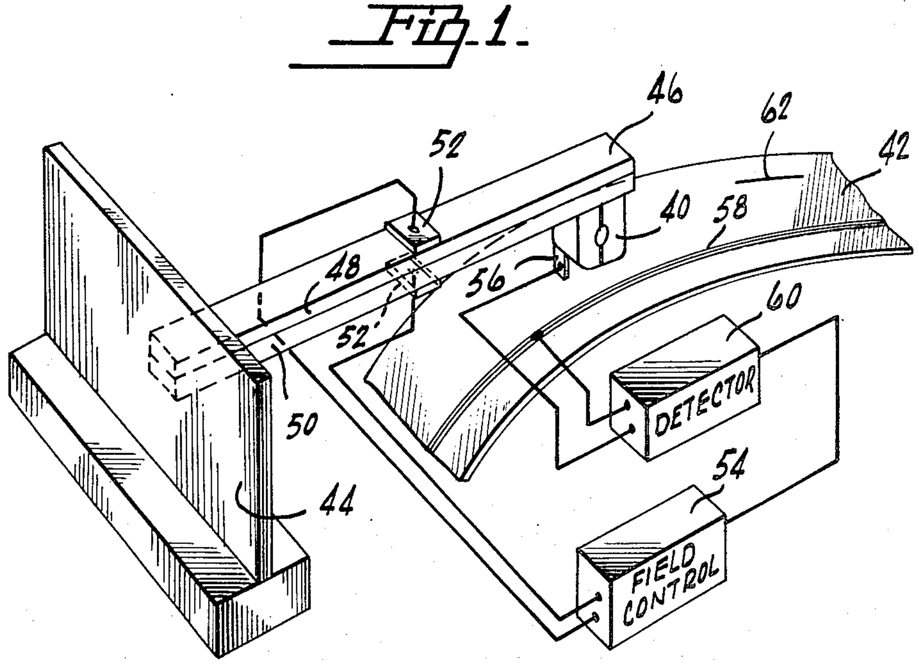
FIG. 2 is a perspective diagrammatic view of a further embodiment of the invention.

FIG. 2 shows a further embodiment for positioning a signal transducer 40 in relation to a movable recording medium 42. As shown in FIG. 2, the recording medium 42 may form a section of a rotary drum or a longitudinal web. The recording medium 42 is mounted by suitable means (not shown) in fixed relation to the support member 44. The transducer 40 is suspended adjacent the recording medium 42 by means of a bar shaped member 46, one end of which is coupled in cantilevered manner to the support 44.

The bar member 46 includes two sections 48 and 50, which are comprised of a material of the type hereinbefore discussed, which exhibit dimensional change in the presence of an electric or magnetic field. At two opposite surfaces of the bar 46, there are provided a pair of electrodes 52, which are coupled to a field control means 54. The field control means 54 provides controlled signal energy to the electrodes 52 to produce a desired field in the material of the bar 46.

As shown in FIG. 2, a third electrode or conductive member 56 is secured to a portion of the transducer 40 facing the recording medium 42. Opposite the member 56 on the recording medium 42, there is provided a further electrode or conductive member 58. For example, where the recording medium 42 is a magnetic tape and the transducer 40 a magnetic head, the members 56 and 58 preferably include a non-ferrous material secured to or plated thereon. The members 56 and 58 are coupled to the input of a detector 60. The output of the detector 60 is coupled to the field control means 54.

In the embodiment of FIG. 2, the sections 48 and 50 of the bar member 46 may be of the same material or two different materials of the field responsive class already discussed. For this arrangement, the material of one of the sections 48 and 50 is oriented with respect to the applied field, to produce an elongation of the material along the axis shown by the arrow 62. The other of the sections 48 and 50 is oriented with respect to the applied field, to produce a contraction of that material along the axis shown by arrow 62. The provision of the combination of an elongating section and a contracting section for the bar member 46, enables greater positional changes of the transducer 40 for a given range of field values applied to the bar 46.

In the operation of the embodiment of FIG. 2, the field control unit 54 in cooperation with the electrode elements 52, causes a given value to be present in the bar 46. The resulting elongation and contraction of the bar sections 48 and 50, positions the transducer 40 in a desired spatial relation with respect to the recording medium 42. The detector means 60 is made to be responsive to a parameter, such as the capacitance between the elements 56 and 58, which is a measure of the distance between the transducer 40 and the recording medium 42.

The detector means 60 provides an input signal to the field control unit 54, which is indicative of the sensed distance between the transducer 40 and the recording medium 42. In response to the signal from the detector 60, the field control 54 produces a signal to provide a field value in the bar 46, which maintains the desired spatial relation between the transducer 40 and the recording medium 42.

One example of monitoring the distance between the transducer 40 and recording medium 42 by capacitive sensing between electrodes has been described. It is understood that other means not shown may be utilized for this purpose, such as optical sensing means.

What is claimed is:

1. Apparatus for providing a controlled amount of separation between a signal transducer and the operating surface of a record medium comprising; support means, first position control means for supporting said transducer from said support means, said first position control means including a first member formed of a material having a dimension in a first given direction, second position control means for supporting said record medium from said support means to dispose said transducer in juxtaposed spaced relation with said record medium, said second position control means including a second member formed of a material having a dimension in a further direction which is substantially normal to said given direction, the material of each of said first and second position control members being of the type that is responsive to at least one of an electric or magnetic field applied thereto to change respectively said dimension of said first member in said given direction and said dimension of said second member in said further direction, with the relative positioning of said transducer with respect to said operating surface being determined by the field responsive dimension of both of said position control members in response to said field being applied to said members.

* * * * *